United States Patent [19]
Gray et al.

[11] 4,126,856
[45] Nov. 21, 1978

[54] SCALES ANNUNCIATOR

[75] Inventors: Robert L. Gray, 426 W. Clifford St., Winchester, Va. 22601; Kenneth D. Keller, Rte. 1, Toms Brook, Va. 22660

[73] Assignees: Robert L. Gray, Winchester; Kenneth D. Keller, Toms Brook, both of Va.

[21] Appl. No.: 788,339

[22] Filed: Apr. 18, 1977

[51] Int. Cl.² ............... G08G 23/18; G08B 21/00
[52] U.S. Cl. ............................. 340/529; 177/12; 340/38 R; 340/666
[58] Field of Search ............... 340/38 R, 38 S, 38 P, 340/38 L, 258 R, 309.1, 258 B, 280; 177/12, 45

[56] References Cited
U.S. PATENT DOCUMENTS

| | | | |
|---|---|---|---|
| 2,663,867 | 12/1953 | Favara et al. | 340/38 R |
| 3,319,222 | 5/1967 | Grant et al. | 340/38 R |
| 3,863,196 | 1/1975 | Hilles | 340/258 B |

Primary Examiner—Glen R. Swann, III
Attorney, Agent, or Firm—Holman & Stern

[57] ABSTRACT

An annunciator to indicate the presence of a truck on a weighing platform to a weigh station operator is disclosed. The apparatus includes a presence sensor operable in response to the weight of the truck on the scales. The sensor provides a signal to a discriminator circuit which, depending upon the length of the signal from the presence sensor, determines whether the truck is merely passing over the scales or has stopped on the scales to be weighed. The discriminator produces an output causing a signaling device to operate and indicate to the operator of the weigh station that a truck is on the scales and is ready to be weighed.

9 Claims, 3 Drawing Figures

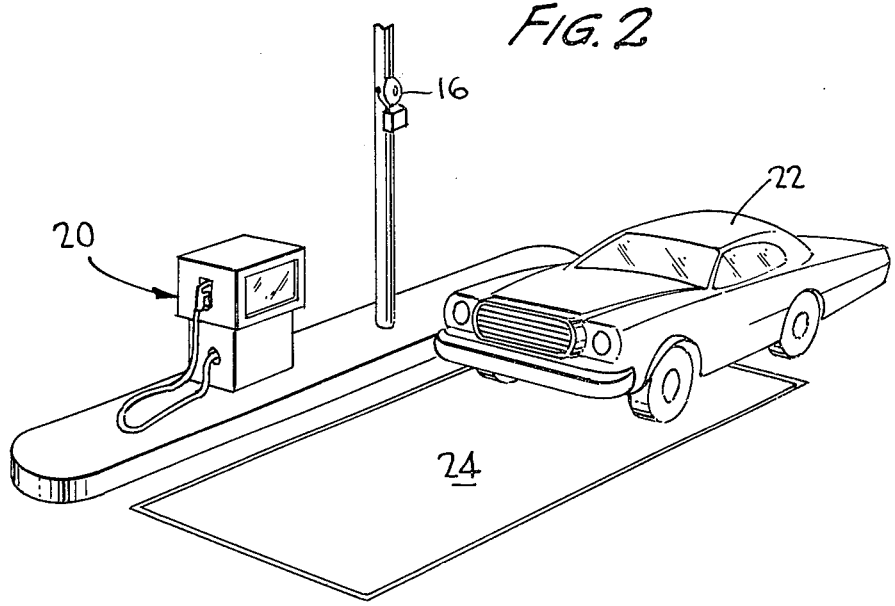
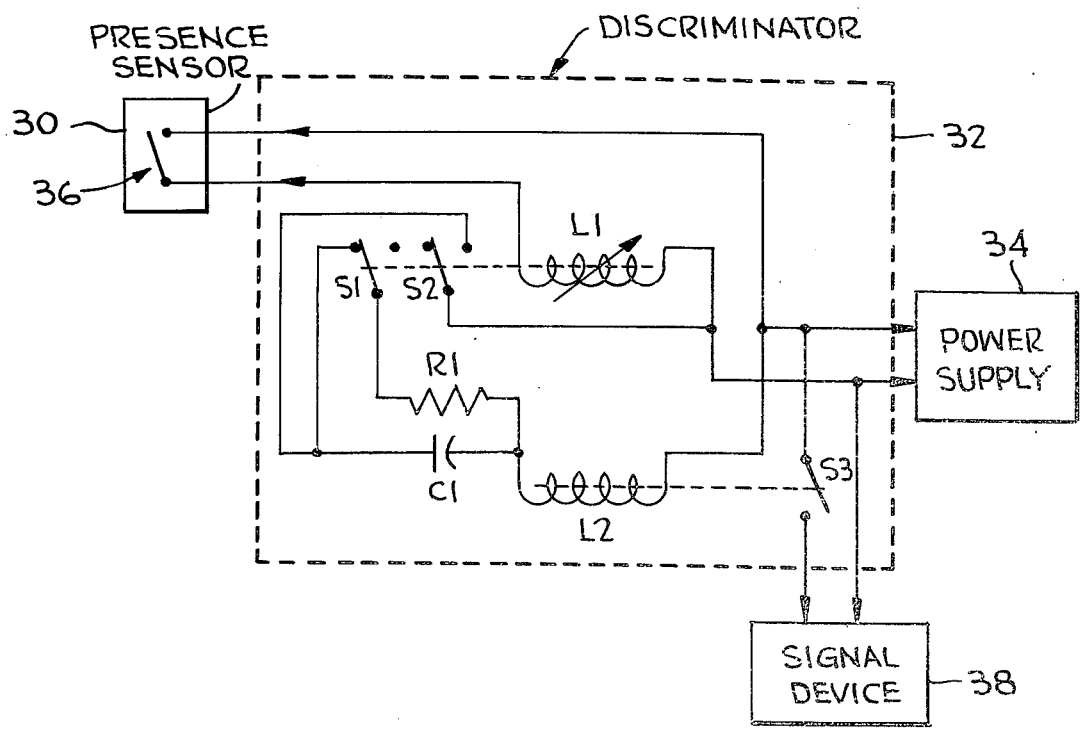

SCALES ANNUNCIATOR

BACKGROUND OF THE INVENTION

The present invention relates to annunciators for indicating the presence of a vehicle which is desirous of being serviced.

The promulgation of weight limit laws for super highways in the past has led to the establishment of numerous weigh stations or truck scales in order to ascertain compliance with the individual state laws regarding maximum load limits. Heavy duty transport trucks are required to pull off of the road into the weighing station whereupon the truck drives onto a weighing platform. Each axle of the truck is driven over the weighing platform with the result that the weight of the truck is checked against the maximum permissable amount by the operator. In order to signal to an operator that a truck is present and is awaiting the required weighing, it has become increasingly common to utilize a signaling device whereby passage of the truck over the device rings a bell signaling the operator to begin the weighing process.

One prior art example of such a weighing device is the apparatus commonly used in gasoline stations to indicate the passage of a car to a gas station attendant who is otherwise occupied. The system generally consists of a hose having one end sealed and the other end connected to a pressure switch. Passage of an automobile or a truck over the hose compresses the hose changing the internal pressure and activating the pressure switch. Operation of the pressure switch would cause a bell or other sensory device to operate and signal the attendant. Unfortunately, these systems have numerous disadvantages. When an extremely heavy truck passes over the hose the hose tends to shift position and generally fails to stay in its proper place. During cold weather operations, the pressure switch has a tendency to freeze up and fail to operate. During wet weather, the pressure switch would short-circuit causing the signaling device to operate and provide an erroneous indication to the attendant. Furthermore, any device that passed over the indicating system would operate the signaling device even if the vehicle was not waiting to be weighed. Furthermore, if the vehicle stopped on the hose, the bell or other sensory device would operate continuously much to the distraction and annoyance of the attendant.

SUMMARY OF THE INVENTION

It is, therefore, an object of the present invention to provide a presence annunciator which discriminates between presence and mere passage.

It is a further object of the present invention to provide an annunciator system for gasoline stations which will announce the presence of a vehicle awaiting service but will not produce a signal when a vehicle momentarily passes by the service area.

It is a still further object of the present invention to provide a scales annunciator which announces the presence of a truck to be weight but does not produce a false alarm when vehicles momentarily pass over the platform scales. A further object of the present invention is to provide a simple, inexpensive annunciator which briefly announces the presence of a vehicle and then is silent, regardless of the length of time the vehicle remains in the vicinity.

The foregoing and other objects are achieved by providing a discriminator circuit which has a built-in and adjustable time delay to allow discrimination between the continuous presence of a vehicle and the mere momentary passage of a vehicle. A presence sensor provides an output which serves to initially energize a discriminator circuit. If the presence sensor maintains its output for longer than a predetermined delay, a relay in the discriminator circuit closes supplying an output to a signaling device which announces the presence of a vehicle at the presence sensor. The output by the discriminator circuit lasts only a short period of time due to the action of the relay after which the output is terminated regardless of the continued output from the presence sensor.

BRIEF DESCRIPTION OF THE DRAWINGS

FIG. 2 is a representational view of the applicants' invention as applied to a service station; and FIG. 3 is a partial schematic view of a preferred embodiment of the present invention.

DETAILED DESCRIPTION OF A PREFERRED EMBODIMENT

Figure 1:
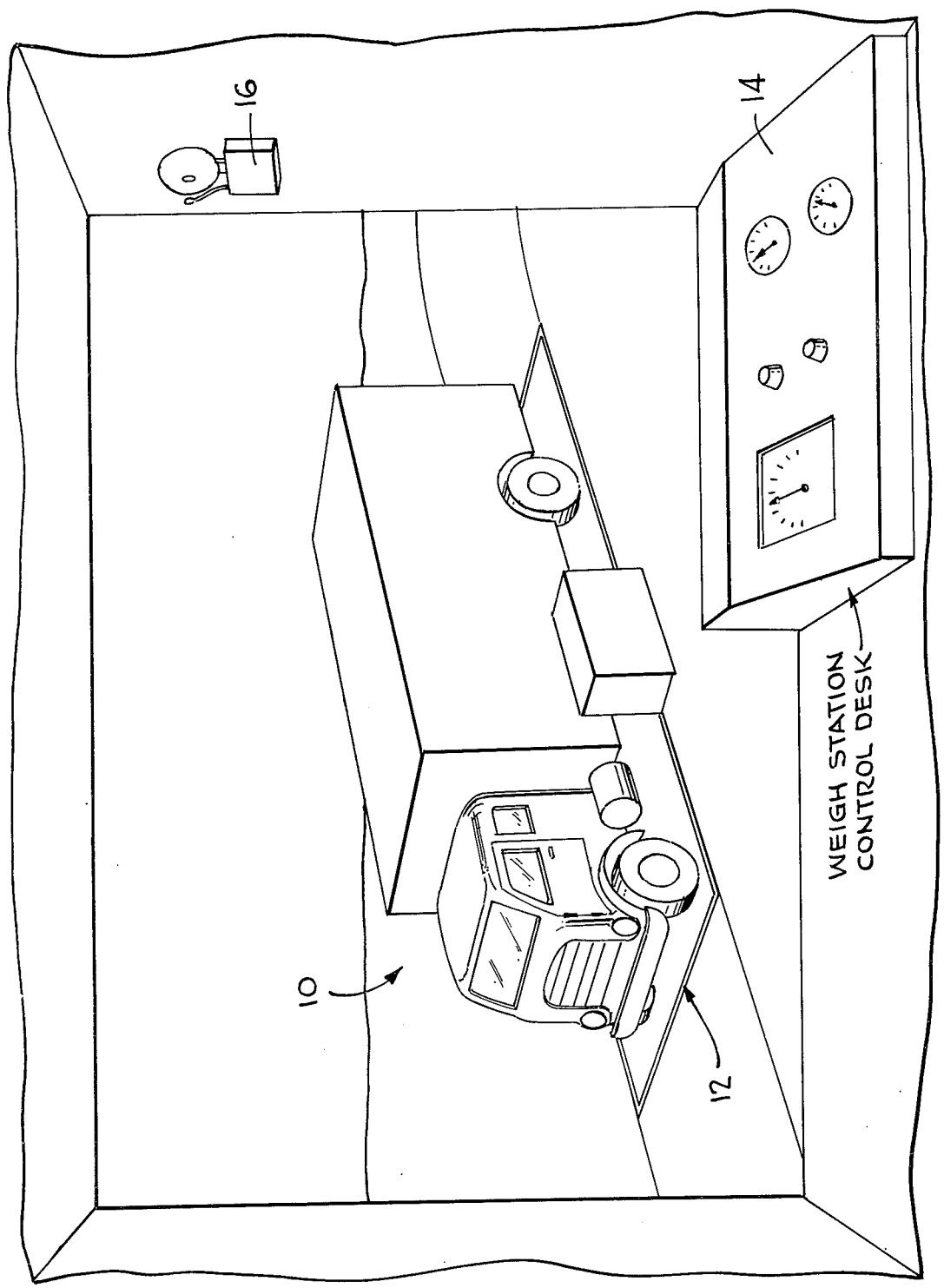
FIG. 1 is a representational view from the control room of a typical weigh station.

FIG. 1 depicts the presence of a truck 10 which is present on platform scales 12. The platform scales 12 provide an indication to the control desk 14 of the weight of the truck indicating whether the driver is in violation of the applicable state laws. The weight of the truck 10 on the platform scales 12 provides a signal which activates a sensory apparatus [for example bell 16].

FIG. 2 depicts a conventional service station including a gas pump 20 and automobile 22. The automobile is resting on a presence sensing device 24 which provides an output to a discriminator circuit for operating the sensory apparatus, for example signaling bell 16.

FIG. 3 details the operational relationship of one embodiment of the applicants' invention. A presence sensor 30 provides an output to the discriminator which is indicative of the presence of a vehicle. As can be seen in FIG. 3, discriminator circuit 32 is supplied with power from power supply 34. Closing of switch 36 causes power to be applied to delay relay $L_1$. Actuation of delay relay $L_1$ opens switch $S_1$ and closes switch $S_2$. Switch $S_2$ connects power supply 34 with relay $L_2$ and capacitor $C_1$. As capacitor $C_1$ is charging, the current flow through relay $L_2$ causes switch $S_3$ to close actuating the signaling device. Thus, it can be seen that only the continued signal from presence sensor 30 [in the form of the closing of switch 36 in a preferred embodiment] for a time period longer than the predetermined delay of relay $L_1$, will produce an output and actuation of the signal 38 [which could be a light, a bell, etc.].

To prevent signal device 38 from operating continuously as long as the vehicle remains on or near the presence sensor 30, it can be seen that because contacts $S_1$ of delay relay $L_1$ are open, the only path for current to flow through relay $L_2$ is the path by which capacitor $C_1$ is charged. Once the capacitor is charged to the voltage of the power supply 34 current flow through relay $L_2$ is terminated and, thus, contacts $S_3$ will be opened terminating the application of power to signal device 38. Thus, the signal device will operate only for a second predetermined period of time which is dependent upon capacitor $C_1$, relay $L_2$, and the power supply 34.

Furthermore, when switch 36 is opened [indicating an absence of a vehicle at presence sensor 30] delay relay $L_1$ is deactivated allowing contact $S_1$ to close. This applies resistor $R_1$ across capacitor $C_1$ allowing it to discharge and resetting the discriminator for the next output from presence sensor 30.

It can be seen by the appropriate selection of a variable delay relay $L_1$, the time during which a signal must be present in order to operate discriminator 32 can be varied if desirable, although in a preferred embodiment this time period is adjusted to be 6 seconds. As noted earlier, the duration that the signaling device 38 operates during an output of discriminator 32 can be adjusted by changing the value of capacitor $C_1$, relay $L_2$, and power supply 34. Variations of the components in discriminator 32 will be obvious to those of ordinary skill in the art in view of the teachings contained herein. The specific presence sensing device 30 could be other than a micro switch located in the platform scales or a pressure switch located adjacent gas pumps in a service station. Any number of signaling devices [bells, flashing lights, or combinations thereof] can be used to indicate the presence of a vehicle being weighed or to keep a permanent recorded record of vehicles which are weighed.

In view of the above teachings, many variations and permutations of this invention will become obvious to those of ordinary skill and the invention is not believed to be limited to the specific structure disclosed in a preferred embodiment. For example, any one of a number of well known counter circuits, delay lines, holding circuits, or other electronic apparatus could be substituted for the components above described in a preferred embodiment. Therefore, the invention is limited only by the scope of the claims appended hereto.

We claim:

1. An apparatus for announcing the presence of a desired object, said apparatus comprising:
sensor means, responsive to the weight of said desired object, for producing an output;
discriminator means, responsive to said sensor means output, for producing an output only when said sensor means output exists over a first predetermined time period; and
sensory means, responsive to said discriminator means output, for signaling the presence of said desired object.

2. The apparatus of claim 1 wherein said sensor means includes a switch responsive to the weight of said desired object.

3. The apparatus of claim 1 wherein said discriminator means includes a variable delay relay operable in response to said signal from said sensor means only after said first predetermined delay.

4. An apparatus for announcing the presence of a desired object, said apparatus comprising:
sensor means, responsive to the presence of said desired object, for producing an output;
discriminator means, responsive to said sensor means output, for producing an output only when said sensor means output exists over a first predetermined time period; and
sensory means, responsive to said discriminator means output, for signaling the presence of said desired object, wherein said sensory means includes:
an electrically operated bell; and
a power supply means, responsive to said discriminator means output, for operating said bell.

5. An apparatus for announcing the presence of a desired object, said apparatus comprising:
sensor means, responsive to the presence of said desired object, for producing an output;
sensor means, responsive to said sensor means output, for producing an output only when said discriminator means output exists over a first predetermined time period; and
sensory means, responsive to said discriminator means output, for signaling the presence of said desired object,
wherein said discriminator means includes interrupt means for terminating said discriminator means output after a second predetermined delay.

6. An apparatus for announcing the presence of a desired object, said apparatus comprising:
sensor means, responsive to the presence of said desired object, for producing an output;
discriminator means, responsive to said sensor means output, for producing an output only when said sensor means output exists over a first predetermined time period; and
sensory means, responsive to said discriminator means output, for signaling the presence of said desired object, wherein said desired object is a truck to be weighed at a weigh station.

7. An apparatus for announcing the presence of a desired object, said apparatus comprising:
sensor means, responsive to the presence of said desired object, for producing an output;
discriminator means, responsive to said sensor means output, for producing an output only when said sensor means output exists over a first predetermined time period; and
sensory means, responsive to said discriminator means output, for signaling the presence of said desired object, wherein said desired object is a car desirous of obtaining service in a service station.

8. An apparatus for announcing the presence of a desired object, said apparatus comprising:
sensor means, responsive to the presence of said desired object, for producing an output;
discriminator means, responsive to said sensor means output, for producing an output only when said sensor means output exists over a first predetermined time period;
sensory means, responsive to said discriminator means output, for signaling the presence of said desired object, wherein said discriminator means includes a variable delay relay operable in response to said signal from said sensor means only after said first predetermined delay; and
interrupt means for terminating said discriminator means output after a second predetermined delay.

9. The apparatus of claim 8 wherein said interrupt means comprises a relay in series with a capacitor and operable in response to said variable delay relay such that actuation of said variable delay relay causes said capacitor to charge through said interrupt means relay causing said interrupt relay to close and provide an output to said sensory means.

* * * * *